United States Patent [19]
Jaffe et al.

[11] 3,714,242
[45] Jan. 30, 1973

[54] PROCESS FOR THE PREPARATION OF L-DOPA

[75] Inventors: Gerald Myer Jaffe, Verona; William Richard Rehl, Upper Montclair, both of N.J.

[73] Assignee: Hoffman-La Roche Inc., Nutley, N.J.

[22] Filed: July 6, 1970

[21] Appl. No.: 52,770

[52] U.S. Cl..............................260/519, 260/501.11
[51] Int. Cl...........................................C07c 101/08
[58] Field of Search.......................................260/519

[56] References Cited

OTHER PUBLICATIONS

Gottstein, W. J., et al. J. Organic Chemistry, (1965), Vol. 30, Pages 2072–2073 relied on.

*Primary Examiner*—Lorraine A. Weinberger
*Assistant Examiner*—L. Arnold Thaxton
*Attorney*—Samuel L. Welt, Jon S. Saxe, Bernard S. Leon, William H. Epstein and George M. Gould

[57] ABSTRACT

The present invention is directed to preparing L-dopa useful as an anti-Parkinson agent directly from the dehydroabietylamine salt of L-N-benzoyl-3-(4-hydroxy-3-methoxyphenyl)-alanine by treating this salt with an aqueous hydrohalic acid.

6 Claims, No Drawings

PROCESS FOR THE PREPARATION OF L-DOPA

BACKGROUND OF THE INVENTION

L-dopa (chemically 3,4-dihydroxyphenyl alanine) has been found to be a remarkably effective therapeutic agent in the treatment of Parkinson's disease. In treating Parkinson's disease, large amounts of this compound are required, making the use of this compound rather expensive. Therefore, it has been the problem of researchers to provide simplified techniques for producing good quality L-dopa.

SUMMARY OF THE INVENTION

In accordance with this invention, it has been found that L-dopa, which has the formula:

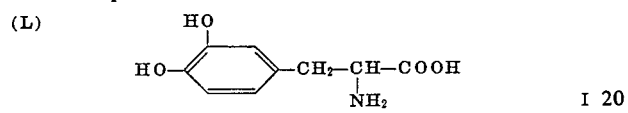

can be produced by treating a dehydroabietylamine salt of the formula:

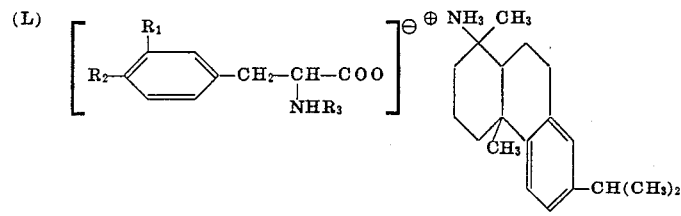

wherein $R_1$ is methoxy; $R_2$ is hydroxy; and $R_3$ is benzoyl;
with an aqueous hydrohalic acid at a temperature of from 100°C. to 150°C.

The above process provides a simple and economic means for directly producing L-dopa from the dehydroabietylamine L-acid salt of formula II in one step.

By this invention, one avoids a two-step procedure wherein the L-acid salt is first converted to the L-acid of the formula:

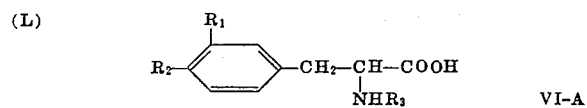

wherein $R_1$, $R_2$ and $R_3$ are as above;
and the L-acid is thereafter hydrolyzed to L-dopa. Therefore, the process of this invention provides a simple and economic method for directly converting the L-acid salt of formula II with L-dopa in a single step.

DETAILED DESCRIPTION OF THE INVENTION

As used herein, the term "halogen" includes all four halogens, i.e., bromine, chlorine, iodine, and fluorine, with chlorine or bromine being preferred. The term "lower alkyl" comprehends both straight and branched chain saturated hydrocarbon moieties having from one to six carbon atoms such as methyl, ethyl, propyl, isopropyl, tert.-butyl and the like. Alkali metal has its usual meaning and includes such metals as lithium, sodium and potassium. The term "lower alkanoic acid" includes lower alkanoic acids containing from one to six carbon atoms such as acetic acid, formic acid, propionic acid, etc The compound of formula II is produced by the following reaction scheme

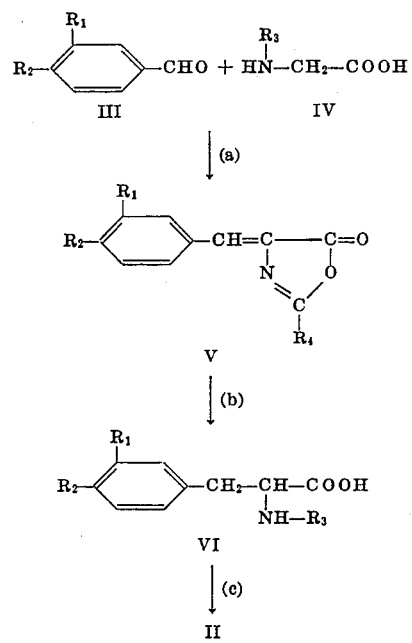

wherein $R_1$, $R_2$ and $R_3$ are as above;
and $R_4$ is phenyl.

In step (a), a compound of the formula III is reacted with a compound of the formula IV to produce a compound of the formula V. This reaction is carried out in the presence of a lower alkanoic acid anhydride and an alkali metal salt of a lower alkanoic acid or alkali metal hydroxide. Any conventional lower alkanoic acid anhydride can be utilized in carrying out this reaction. Among the lower alkanoic acid anhydrides, acetic anhydride is preferred. This reaction is also carried out in the presence of an anhydrous alkali metal salt of a lower alkanoic acid or an alkali metal hydroxide. The preferred alkali metal salt of a lower alkanoic acid which can be utilized in accordance with this invention is anhydrous sodium acetate. The preferred alkali metal hydroxide which can be utilized in this process is sodium hydroxide. The reaction of step (a) is preferentially effected in the presence of an inert organic solvent. Any conventional inert organic solvent can be utilized in carrying out this reaction. Among the preferred inert organic solvents are included dimethylformamide; ethers such as tetrahydrofuran; dimethylsulfoxide; and lower alkanols such as ethanol, methanol and the like. In carrying out this invention, temperature and pressure are not critical and this reaction can be carried out at room temperature and atmospheric pressure. However, it is generally preferred to conduct this reaction at the reflux temperature of the reaction medium.

The reaction of step (b) is carried out by subjecting the compound of formula V to catalytic hydrogenation. Any conventional means of catalytic hydrogenation can be utilized to convert the compound of the formula V to the compound of the formula I above. Generally, this hydrogenation is carried out in an aqueous alkaline medium. Any conventional inorganic alkali such as sodium hydroxide can be utilized to provide the alkaline medium. In carrying out this reaction, any conventional hydrogenation catalyst such as Raney-nickel, Raney-cobalt, platinum, palladium or the like can be utilized. This catalyst can be utilized with or without a carrier material such as charcoal or carbon. In carrying out this hydrogenation reaction, hydrogenation pressures of about 1 to about 50 atmospheres (gauge) are utilized. Generally, it is preferred to carry out this reaction at a hydrogenation pressure of from about 1 to about 20 atmospheres (gauge). In carrying out this reaction, temperature is not critical and this reaction can be carried out at room temperature. If desired, elevated temperatures such as 100° C. can be utilized. Generally, it is preferred to carry out this reaction at a temperature of from about 20° C. to about 60° C.

The reaction of step (c) is carried out by reacting one mole of the compound of formula VI with 0.4 to 0.6 moles of an alkali metal hydroxide, ammonia or an organic amine and from 0.4 to 0.6 moles of dehydroabietylamine. A mixture results. This mixture consists of ½ mole of the dehydroabietylamine salt of the L-antipode of the compound of formula II (compound II) and ½ mole of the alkali metal, ammonium or organic amine salt of the D-antipode of the compound of formula IV. The L-salt of formula II precipitates out of the solvent medium while the alkali metal, ammonium or organic amine salt of the D-antipode of formula II above remains in solution. In this manner, the L-salt of formula II is easily obtained from the compound of formula VI above.

The reaction of step (c) is carried out in an inert organic solvent, preferably a lower alkanol solvent, or in a mixture of water and a lower alkanol solvent. Any conventional lower alkanol can be utilized as the reaction medium. Among the preferred lower alkanol solvents are included methanol and ethanol. This reaction can be carried out by utilizing temperatures of from 20° C. to the reflux temperature of the reaction medium. Upon cooling to room temperature (30° C.) or below (0° C.), the L-salt of formula II crystallizes out of solution. This L-salt can be recovered in high yields from the mother liquors by filtration.

The L-salt of formula II is converted to the L-dopa by treating the L-salt of formula II with an aqueous hydrohalic acid at temperatures of from 100° C. to 150° C. In carrying out this reaction, any conventional hydrohalic acid can be utilized. The preferred acid for use in this reaction is aqueous hydrobromic acid. The hydrohalic acid utilized in this reaction should have a concentration of from about 20 percent to 70 percent by weight, based upon the total weight of the aqueous acid. Generally, it is preferred to utilize an acid having a concentration of from 45 percent to 65 percent by weight, with an acid having a concentration of 62 percent being especially preferred. In this reaction, the aqueous hydrohalic acid is generally utilized as the reaction medium. Generally, this reaction is carried out at the reflux temperature of the reaction medium. However, temperatures of 100° C. to 150° C. can be utilized, with temperatures of from 110° C. to 125° C. being preferred. This reaction is carried out at atmospheric pressure. However, if it is desired to carry out the reaction at temperatures greater than the atmospheric boiling temperatures of the reaction medium, pressure is applied to the reaction system. If desired, pressures of from 1 atmosphere to 5 atmospheres can be utilized in carrying out this reaction.

The reaction of the acid salt of formula II with a hydrohalic acid produces L-dopa and a salt of the formula: v,20

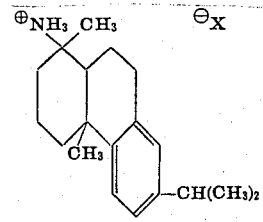

XI wherein X is a halide ion. The L-dopa can be separated from the reaction medium containing the salt of formula XI by extracting the salt of formula XI from the reaction medium with a water immiscible organic solvent such as toluene, benzene, xylene, etc. The compound of formula XI can be converted to dehydroabietylamine by neutralization with a base such as an alkali metal hydroxide. Any conventional base can be utilized. In carrying out this neutralization, temperature and pressure are not critical and this reaction can be carried out at room temperature and atmospheric pressure. If desired, higher or lower temperatures can be utilized. The dehydroabietylamine thus obtained can be recycled to resolve an additional amount of the compound of formula VI above.

It is understood that the following examples are representative and not limitative of the foregoing invention. All temperatures stated are in degrees centigrade. The petroleum ether utilized in these examples has a boiling point of 60° C. to 80° C. When ether is referred to in the examples, diethyl ether is meant.

EXAMPLE 1

31.5 g. of D,L-N-benzoyl-3-(4-hydroxy-3-methoxyphenyl)-alanine and 28.5 g. of dehydroabietylamine are placed in about 80 ml. of absolute methanol and heated. On boiling, all of the reactants dissolve. The resulting solution is then allowed to cool so that a precipitate is formed. After 22 hours at room temperature, the precipitate is filtered off and rinsed portionwise with a total of 50 ml. of ice-cold methanol, then with diethyl ether, and dried at 60° C. under vacuum. For recrystallization, this salt is dissolved in 800–1000 ml. of boiling methanol, filtered off hot, concentrated to about 100 ml. (whereby the substance begins to crystallize out), left to stand at room temperature for an hour, thereupon treated with 700 ml. of diethyl ether and left to stand overnight at 0° C. On the next morning, it is filtered, washed with ether and dried. 28.6 g. of dehydroabietylamine salt of the L-antipode are obtained in the form of white crystals with a melting point of 232°– 233° C.; $[\alpha]_D^{24} = +55.0°$ ($c = 1$ in methanol). A second recrystallization does not raise the rotation.

EXAMPLE 2

76 g. of vanillin, 89.5 g. of hippuric acid, 75 g. of anhydrous sodium acetate, 150 ml. of acetic anhydride and 25 ml. of dimethylformamide are added in the stated order into a flask provided with a condenser and calcium chloride tube. The mixture is thereupon stirred at a bath temperature of 100° C. for 15–30 minutes. The bath is removed and 700–1000 ml. of distilled water are added dropwise within about 15 minutes in such a way that the mixture does not become difficult to stir. The mixture is cooled by leaving it at 0° C. for 3–5 hours. The resulting precipitate is then filtered off and washed with abundant (6–8 portions) of cold distilled water. After drying the crystals under vacuum, there are obtained 131–136 g. of 2-phenyl-4-(o-acetyl-vanillylidene)-2-oxazolin-5-one as yellow crystals which melt at 190°–192° C.

EXAMPLE 3

280 g. of 2-phenyl-4-(o-acetyl-vanillylidene)-2-oxazolin-5-one in 6 l. of distilled water are treated with 250 g. of solid pure sodium hydroxide and then with 70 g. of Raney-nickel and hydrogenated at 60° C. and 100 atmospheres (gauge). The hydrogenation mixture is thereupon filtered off, the catalyst rinsed with distilled water, the filtrate warmed to 60° C. in an open vessel and cautiously made congo-acidic (pH about 2) with concentrated hydrochloric acid. The product is allowed to crystallize out by standing overnight at 0° C. The crystals are then filtered off and washed with 3 portions of ice-cold distilled water and dried in vacuum at 60° C.

For purification, the crude crystalline material, while still hot, is dissolved in 400 ml. of methanol. After this, 800 ml. of distilled water are cautiosuly added and the mixture is seeded if necessary. The solution is allowed to stand overnight at 0° C. to form crystals. The crystals are filtered off, rinsed with distilled water and dried. 189 g. of D,L-N-benzoyl-3-(4-hydroxy-3-methoxyphenyl)-alanine are obtained as colorless crystals of melting point 160°–161° C.

EXAMPLE 4

31.5 g. of D,L-N-benzoyl-3-(4-hydroxy-3-methoxyphenyl)-alanine are dissolved in 50 ml. of methanol at 50° C. At the same time, likewise at 50° C., 14.2 g. of dehydroabietylamine (0.05 mole) are dissolved in 20 ml. of methanol. The methanolic dehydroabietylamine solution is poured into the acid solution and the flask rinsed with 5 ml. of methanol. After seeding, crystallization of the dehydroabietylamine salt of the L-antipode occurs. The mixture is allowed to stand overnight at room temperature and the crystals are filtered off on the following morning. After rinsing with 50 ml. of methanol at 0° C. and drying in vacuum at 60°–70° C., there are obtained 18.8 g. of dehydroabietylamine salt of the L-antipode with the specific rotation $[\alpha]_D^{20} = +49.9°$ ($c = 1$ in methanol).

EXAMPLE 5

50 ml. of 1-N sodium hydroxide (0.05 mole) and 80 ml. of methanol are added to 31.5 g. of D,L-N-benzoyl-3-(4-hydroxy-3-methoxyphenyl)-alanine (0.1 mole). On warming to 50° C., the alanine goes into solution. At the time, likewise at about 50° C., 14.2 g. of dehydroabietylamine (0.05 mole) are dissolved in 30 ml. of methanol. The methanolic dehydroabietylamine solution is added to the alanine solution and the flask is rinsed with 10 ml. of methanol. The crystallization of the dehydroabietylamine salt of the L-antipode occurs very rapidly. This mixture is left to stand overnight at room temperature and the crystals filtered off on the following morning. After rinsing the crystals with 50 ml. of methanol/water (1:1 parts by volume) at a temperature of about 10° C. and drying, there are obtained 27 g. of dehydroabietylamine salt of the L-antipode with the specific rotation $[\alpha]_D^{20} = +49.5°$ ($c = 1$ in methanol).

EXAMPLE 6

50 ml. of 1-N ammonia (0.05 mole) and 80 ml. of methanol are added to 31.5 g. of D,L-N-benzoyl-3-(4-hydroxy-3-methoxyphenyl)-alanine (0.1 mole). On warming to 50° C., the alanine goes into solution. At the same time, likewise at 50° C., 14.2 g. of dehydroabietylamine (0.05 mole) are dissolved in 30 ml. of methanol. The methanolic dehydroabietylamine solution is added to the acid solution and the flask is rinsed with 10 ml. of methanol. The crystallization of the dehydroabietylamine salt of the L-antipode occurs very rapidly. This mixture is allowed to stand overnight at room temperature and the crystals are filtered on the following morning. After rinsing the crystals with 50 ml. of methanol/water (1:1 parts by volume) about 10° C. and drying, there are obtained 26.7 g. of dehydroabietylamine salt of the L-antipode with the specific rotation $[\alpha]_D^{20} = +49.8°$ ($c = 1$ in methanol).

EXAMPLE 7

A mixture of 30 g. of the dehydroabietylamine salt of the L-antipode prepared in Example 1, 5 ml. of water, 5 ml. of toluene and 38.4 ml. of 62 percent by weight aqueous hydrobromic acid were stirred and refluxed (at about 105°–112° C.) for three hours. The mixture was cooled to 80° C. and extracted at 80° C. three times, each with 50 ml. portions of toluene. After this period, a two-phase reaction mixture resulted. The lower aqueous phase was separated from the upper toluene phase and evaporated under vacuum to dryness. The residual solution was dissolved in 60 ml. of water. The solution was filtered over charcoal and the filtrate was then warmed to 80° C. and its pH adjusted to 3.5 with 10 percent by weight aqueous ammonium hydroxide. After this, the resultant reactant mixture was cooled to room temperature and there resulted crude L-3-(3,4-dihydroxyphenyl alanine). This crude crystalline material was filtered, washed and dried. There resulted 7.3 g. of pure crystalline L-3-(3,4-dihydroxyphenyl alanine).

EXAMPLE 8

5 ml. of the upper toluene phase prepared in Example 7 was cooled to 15° C. by storing in a refrigerator for 18 hours. During storage crystals formed which were filtered from the solution and washed with chilled toluene. These crystals which had m.p. of 245°–248° C. were dehydroabietyl hydrobromide.

EXAMPLE 9

30 grams of the dehydroabietylamine hydrobromide crystals prepared in Example 8, were suspended in a mixture of 80 ml. of water and 50 ml. of toluene. To this suspension sufficient amount of 6.0 N sodium hydroxide was added until pH was 12. The toluene phase was then separated from the aqueous phase. The aqueous phase was extracted three times, each with 40 ml. of toluene. All of the toluene phases were combined and treated with 1 g. of charcoal and the charcoal filtered off from the toluene solution. After the filtering, the toluene solution was distilled at 60° C. and 12 mmHg pressure to leave dehydroabietylamine as an oil which on standing at room temperature crystallized.

We claim:

1. A process for producing L-dopa comprising reacting a dehydroabietylamine salt of the formula:

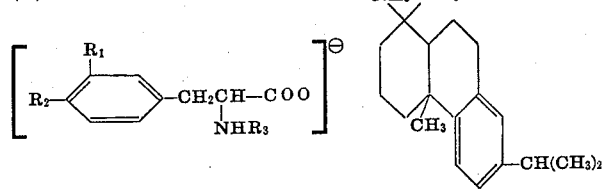

wherein $R_1$ is methoxy; $R_2$ is hydroxy; and
$R_3$ is benzoyl;
with an aqueous solution containing 20–70 percent by weight hydrohalic acid at a temperature of from 100°–150° C.

2. The process of claim 1 wherein said aqueous hydrohalic acid contains the hydrohalide in an amount of about 62 percent by weight.

3. The process of claim 1 wherein said reaction is carried out at a temperature of from 110°–125° C.

4. A process for producing L-dopa comprising reacting a dehydroabietylamine salt of the formula:

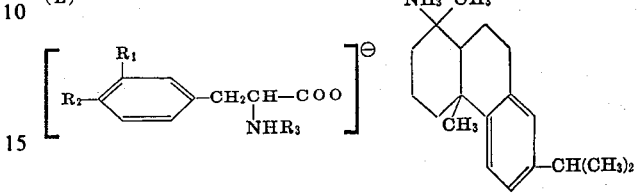

wherein $R_1$ is methoxy; $R_2$ is hydroxy; and
$R_3$ is benzoyl;
with an aqueous solution containing 20–70 percent by weight hydrobromic acid at a temperature of from 100°–150° C.

5. The process of claim 4 wherein said aqueous hydrobromic acid contains the hydrohalide in an amount of about 62 percent by weight.

6. The process of claim 4 wherein said reaction is carried out at a temperature of from 110°–125° C.

* * * * *